United States Patent [19]
Lin

[11] Patent Number: 5,816,284
[45] Date of Patent: Oct. 6, 1998

[54] TIRE VALVE EXTENSION ATTACHMENT

[76] Inventor: Nan-Cheng Lin, No. 92, Lane 548, Pei An Road, Sec. 4, Tainan, Taiwan

[21] Appl. No.: 704,817

[22] Filed: Aug. 28, 1996

[51] Int. Cl.⁶ .................................................... F16K 31/46
[52] U.S. Cl. .......................... 137/223; 251/293; 152/415
[58] Field of Search ................................. 137/223, 231; 251/293; 152/415

[56] References Cited

U.S. PATENT DOCUMENTS

| | | | |
|---|---|---|---|
| 1,430,461 | 9/1922 | Michelin | 137/223 |
| 1,478,983 | 12/1923 | Hathaway | 137/223 X |
| 2,178,828 | 11/1939 | Broecker | 251/293 |
| 2,508,503 | 5/1950 | Doepke | 137/223 |
| 2,812,000 | 11/1957 | Trinca | 251/293 X |
| 3,315,695 | 4/1967 | Boyer | 137/232 |
| 4,445,527 | 5/1984 | Leimbach | 137/223 X |
| 4,807,658 | 2/1989 | Patti | 137/223 |
| 5,121,780 | 6/1992 | Goodman | 152/415 |

FOREIGN PATENT DOCUMENTS

| | | | |
|---|---|---|---|
| 30072 | 11/1930 | Australia | 137/223 |
| 520502 | 6/1953 | Belgium | 137/223 |
| 872246 | 7/1961 | United Kingdom | 137/231 |

*Primary Examiner*—John Rivell
*Assistant Examiner*—Meredith H. Schoenfeld
*Attorney, Agent, or Firm*—Rosenberg, Klein & Bilker

[57] ABSTRACT

A tire valve extension attachment connected to tire valve for fascilitating inflation of the tire. The extension attachment comprises a housing, a top element an upper holder element, a lower holder element and a depressing rod, wherein the depressing rod is passed through both holder members and fixedly connected with the top element; the holder members each have protrusions surrounding the depressing rod to limit the transverse movement of the depressing rod. The top element, when the extension attachment is connected to an air pump, is depressed and allows air to pass into the extension attachment from an aperture formed between the top element and the housing and finally through the tire valve to inflate the tire, the depressing rod being simultaneously depressed so as to force the tire valve to open. Every two adjacent protrusions of the holder members have a vent hole in between for air to pass through the holder members in inflating the tire.

2 Claims, 4 Drawing Sheets

TIRE VALVE EXTENSION ATTACHMENT

BACKGROUND OF THE INVENTION

In order to facilitate connection of an air pump to a vehicle tire valve, referring to FIG. 4, an extension member is usually provided to connect with the tire valve. The extension member is substantially elongate shaped and engaged with the tire valve by threads and has a depressing rod 11 provided therein to open the tire valve when the extension member is connected to an air pump, thereby making the tire capable of being inflated. Furthermore, a plastic cap is engaged with the top end of the extension member by threads to prevent dust from going into the extension member.

The cap is prone to get collapsed on the threads thereof and fall out of engagement. Consequently, the extension member becomes unprotected and dust going into it, resulting in air leak of the extension member. On the other hand, the depressing rod 11 makes the tire valve opened although it has yet to be connected with an air pump, resulting in air leak from the joint between the extension member and the tire valve when the extension member fails to firmly engage with the tire valve.

SUMMARY OF THE INVENTION

The tire valve extension attachment comprises a housing and a depressing apparatus housed inside the housing.

The depressing apparatus includes a depressing rod, a top element, a spring, an upper holder member, a hollow cylinder and lower holder member.

The upper holder member has protrusions extending from the inner wall thereof. Every pair of adjacent protrusions define a vent hole in between. The lower holder member has projections extending from the inside wall thereof. Every pair of adjacent projections define a vent hole in between. An annular pad is firmly mounted around an annular recessed part of the lower holder member.

In combination, the depressing rod is passed through the lower holder member, the hollow cylinder, the upper holder member, the spring, and the top element in sequence. The top element is firmly connected with a top end of the depressing rod.

The top element and the depressing rod is slidable within the housing. Then the assembled depressing apparatus is fitted to inside of the housing with the upper and ower holder members being fixed inside the housing.

The top element is movable between a depressed position and a not-depressed position; when the tire valve extension attachment is connected with an air pump from the top end thereof, the top element is depressed, causing formation of an aperture between the top element and the housing for inflating the tire; when the air pump is removed, the top element is biased to the not-depressed position by the spring, causing formation of an airtight joint between the top element and the housing.

BRIEF DESCRIPTION OF DRAWINGS

The invention will be better understood by reference to the accompanying drawings, wherein.

DESCRIPTION OF THE PREFERRED EMBODIMENTS

Figure 1:
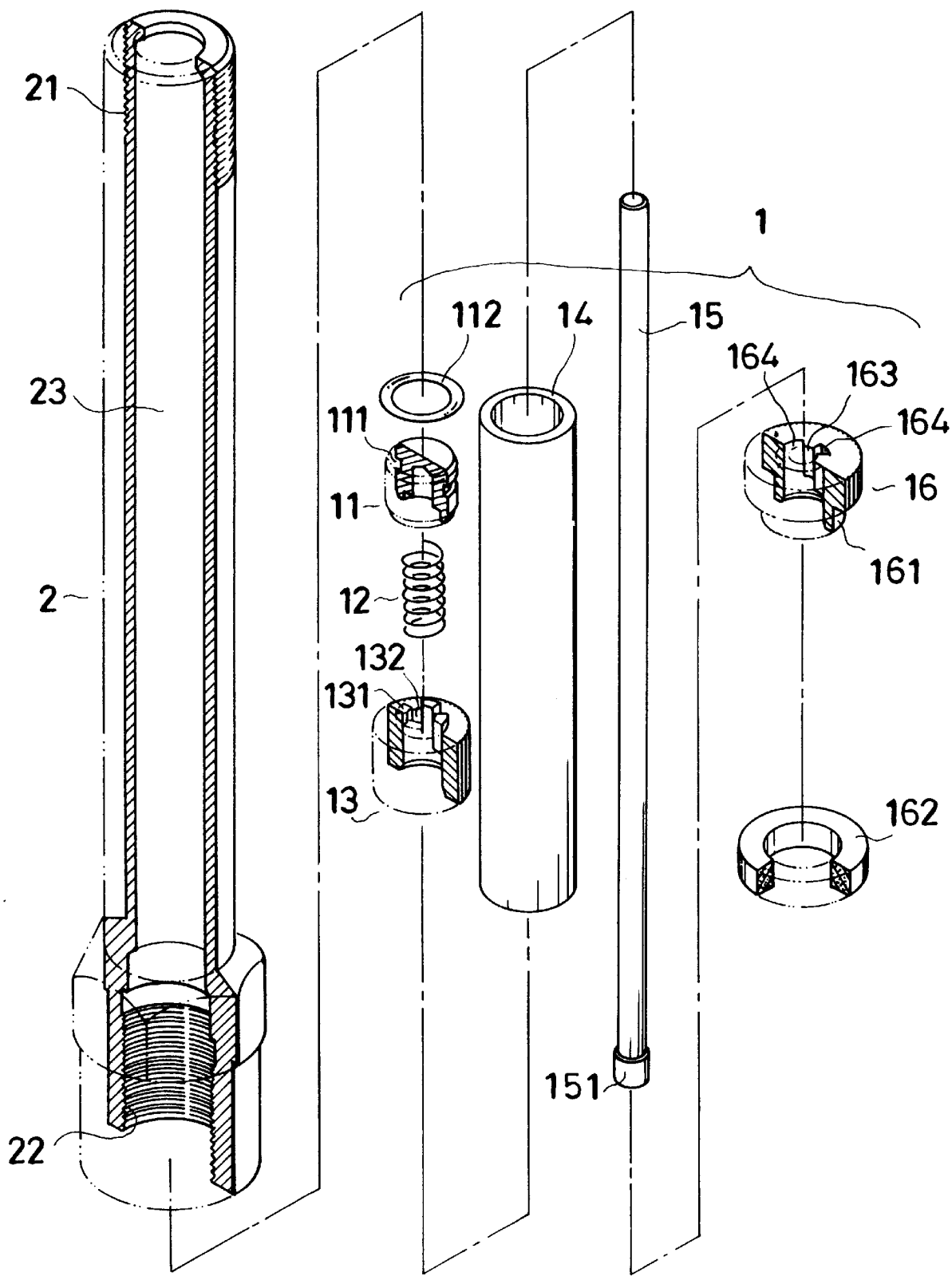
FIG. 1 is an exploded view of a tire valve extension attachment of the present invention.
Figure 2:
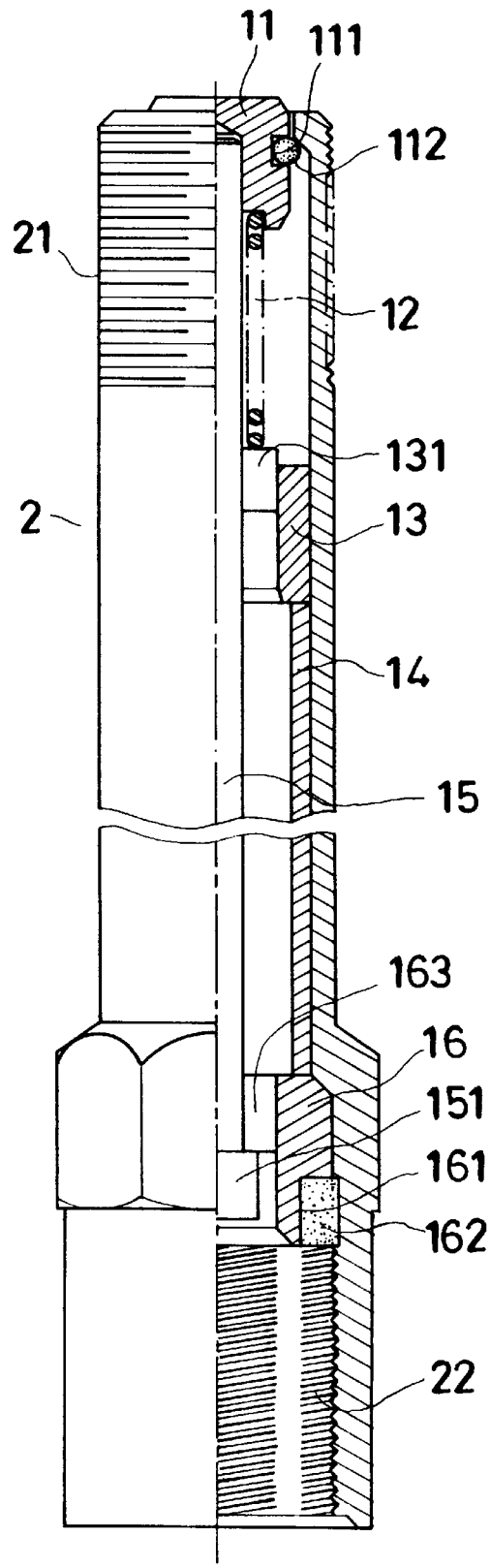
FIG. 2 is a longitudinal section view of a tire valve extension attachment of the present invention.

A tire valve extension attachment, referring to FIGS. 1 and 2, is provided which comprises a housing 2 and a depressing apparatus 1 housed inside the housing 2 as the main parts.

The depressing apparatus 1 includes a depressing rod 15, a top element 11, a spring 12, an upper holder member 13, a hollow cylinder 14 and a lower holder member 16.

The top element 11 has an annular recess 111. A ring 112 is mounted to, and received in the annular recess 111. The upper holder member 13 has a central through hole defined by an inner wall thereof and a plurality of protrusions 131 extending from the inner wall thereof. Every pair of adjacent protrusions 131 define a vent hole 132 in between. The lower holder member 16 has an annular recessed part 161 on an outward circumference thereof, a central through hole defined by an inside wall thereof, and a plurality of projections 163 extending from the inside wall thereof. Every pair of adjacent projections 163 define a vent hole 164 in between. An annular pad 162 is firmly mounted around the annular recessed part 161.

The housing 2 is provided with an interior hollow 23, an outward threaded part 21 at an upper end thereof and an inward threaded part 22 at an lower end thereof.

In combination, the depressing rod 15 is passed through the lower holder member 16, the hollow cylinder 14, the upper holder member 13, the spring 12, and the top element 11 in sequence. The top element 11 is firmly connected with a top end of the depressing rod 15 which is slidable relative to the hollow cylinder 14 and the upper and lower holder members 13, 16. Then the assembled depressing apparatus 1 is fitted to inside of the housing 2 with the top element 11 of the depressing apparatus 1 being arranged at the upper end of the housing 2, and with the upper and lower holder members 13 and 16 being each firmly griped by, and fixed inside, the inner wall of the housing 2 at a respective appropriate position. The top element 11 is movable between a depressed position and a not-depressed position; when the tire valve extension attachment is connected with an air pump from the top end thereof, the top element 11 is depressed, causing formation of an aperture between the ring 112 of the top element 11 and the housing 2; when the air pump is removed, the top element 11 is biased to the not-depressed position by the spring 12, causing formation of an airtight joint between the ring 112 and the housing 2.

Figure 3:
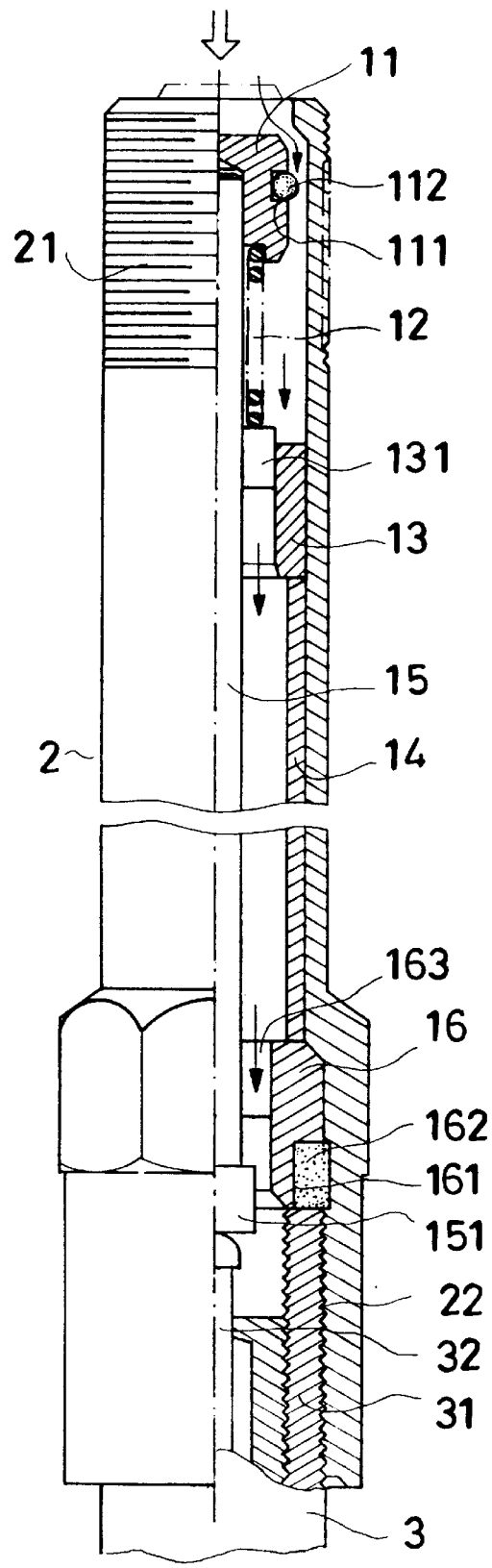
FIG. 3 is a view showing flow of air through the tire valve extension attachment of the present invention; and, FIG. 4 is a prior art tire valve extension member as described in the BACKGROUND.
Figure 4:
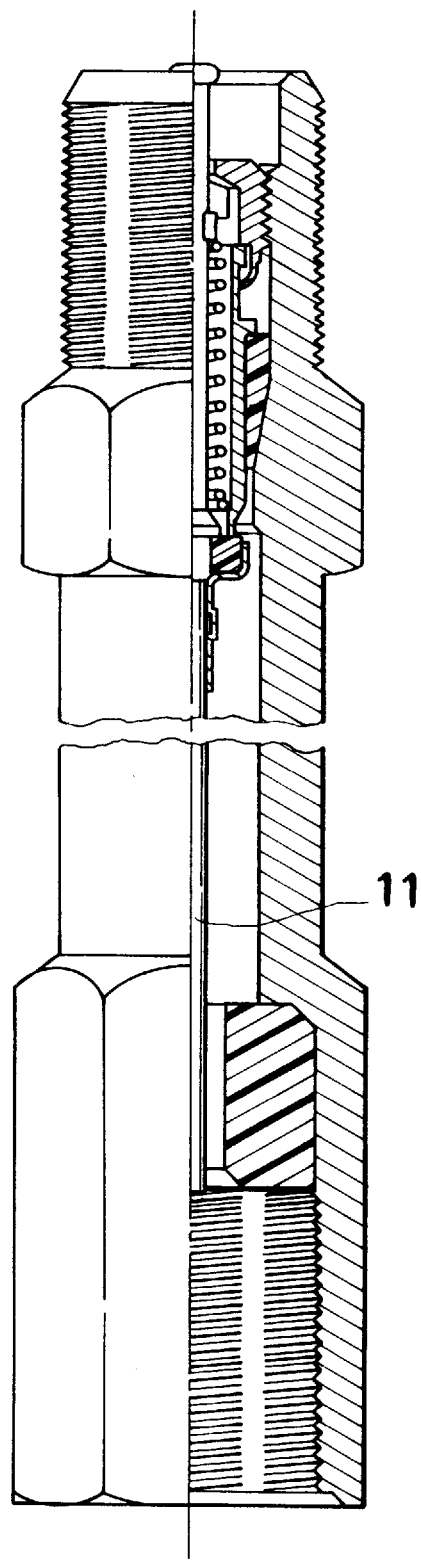

On the other hand, when the top element 11 is depressed, the depressing rod 15 also slides downward along an axis thereof simultanously, forcing a tire valve 3 to open for air to pass therethrough, referring to FIG. 3, which tire valve 3 has a threaded wall 31 engaged with the inward threaded part 22 of the housing 2 as well as a rod potion 32, which is under the annular convex 151 of the depressing rod 15 and capable of being displaced to a depressed position so as to open the valve 3 by the downward sliding of the depressing rod 15.

The annular pad 162 is provided to form an airtight connection between the threaded wall 31 of the valve 3 and the valve extension attachment of the present invention.

In using the valve extension attachment, referring to FIG. 3, after the attachment is engaged with a tire valve and after the upper end of the attachment is connected to an air pump, air from the air pump flows into the attachment through the aperture between the housing 2 and the top element 11 and then through the valve into a tire fitted with the valve.

A plurality of extension attachments of the present invention can be connected in series if one needs such to facilitate the inflating operation.

The vent holes 132, 164 provides enough room for air to quickly pass through in inflating the tire, whereby the protrusions 131 of the upper holder member 13 and the projections 163 of the lower holder member 16 can be, and is actually, formed to be relatively close to the circumference of the depressing rod 15 to prevent the depressing rod 15 from moving away from the sliding path thereof.

From the above description, it can be understood the tire valve extension attachment has following advantages.

1. The attachment doesn't need a cap to fit thereon to prevent air from leaking, eliminating the risk of air leakage caused by the loss of the cap.

2. The depressing rod 15 doesn't depress the rod portion 32 of the tire valve 3 unless the attachment is connected to an air pump, eliminating the disadvantages of air leakage as described in the BACKGROUND.

3. The top element 11, when not in depressed position, can prevent dust from getting in the attachment.

4. The provision of the vent holes 132, 164 allows the protrusions 131 and the projections 163 to be relatively close to the depressing rod 15 thereby preventing the depressing rod 15 from moving transversely.

While the preferred embodiments of the invention have been described above, it will be recognized and understood that various modifications may be made therein and the appended claims are intended to cover all such modifications which may fall within the spirit and scope of the invention.

What is claimed is:

1. In a tire valve extension attachment, in combination:

a top element having an annular recess on an outward circumference thereof, said annular recess having a ring mounted therearound;

a depressing rod having a first end firmly connected to said top element and a second end opposite said first end;

a spring, said spring being arranged under said top element and inserted by said depressing rod;

a first holder member having a central through hole defined by an inner wall thereof and a plurality of protrusions extending from said inner wall; two adjacent said protrusions defining a vent hole in between; said first holder member being arranged under said spring and inserted by said depressing rod from said central through hole;

a hollow cylinder, said hollow cylinder being arranged under said first holder member and inserted by said depressing rod;

a second holder member having a central through hole defined by an inside wall thereof, a plurality of projections extending from said inside wall and an annular recessed part on an outward circumference thereof; two adjacent said projections defining a vent hole in between; an annular pad being mounted around said annular recessed part; said second holder member being arranged under said hollow cylinder and inserted by said depressing rod;

a housing having an interior hollow, an outward threaded part at a first end and an inward threaded part at a second end thereof for engaging with a tire valve;

said housing receiving said top element, spring, first holder member, hollow cylinder, depressing rod and second holder member combined together therein with said top element being arranged adjacent to said first end of said housing; said first and second holder members being fixed to said interior hollow; said top element and said depressing rod being moved together along an axis of said depressing rod toward said second end of said housing upon connection of said first end of said housing to an air pump; said second end of said depressing rod forcing a tire valve connected to said extension attachment to open so as to allow air to get into said tire valve upon said movement of said depressing rod; said top element, when removed away from said air pump, being biased by said spring to form an airtight joint with said first end of said housing.

2. The tire valve extension attachment as recited in claim 1, wherein said protrusions and said projections are formed such that said depressing rod is at least protected from moving away from said axis.

* * * * *